Sept. 13, 1927.

W. E. TEKKER

ROOFING TOOL

Filed Sept. 17, 1926

1,642,390

William E. Tekker

INVENTOR.

BY

ATTORNEY.

Patented Sept. 13, 1927.

1,642,390

UNITED STATES PATENT OFFICE.

WILLIAM E. TEKKER, OF PENN TOWNSHIP, ST. JOSEPH COUNTY, INDIANA.

ROOFING TOOL.

Application filed September 17, 1926. Serial No. 136,097.

The invention relates to roofing tools, and has for its object to provide a device of this character particularly adapted for use in applying asphalt roofing and having in connection therewith means whereby substantially all of the different operations during the applying of an asphalt roof may be accomplished with the same tool.

A further object is to provide an asphalt roofing tool comprising an elongated member having an elongated opening therethrough, cutting edges around said opening at one end thereof, thereby forming side and end cutting edges, a hammer engaging member adjacent the end cutting edge and a handle member at the opposite end of the device, thereby allowing the operator to force the end cutting edge through a portion of an asphalt shingle and simultaneously to force the handle member and device downwardly thereby insuring a clean cutting of the shingle by the side cutting edges.

A further object is to provide one end of the device with a longitudinally extending pointed projection having its opposite sides sharpened and adapted to be used for cutting and fitting shingles, and at the same time provides means whereby the workman may force the tool as a whole into a roof for preventing slipping and for using the same as a support.

A further object is to provide the outer end of the handle member with a bifurcated portion, which may be used for pulling nails and for prying purposes. The hammer engaging member may be also used as a hammer poll for driving nails.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
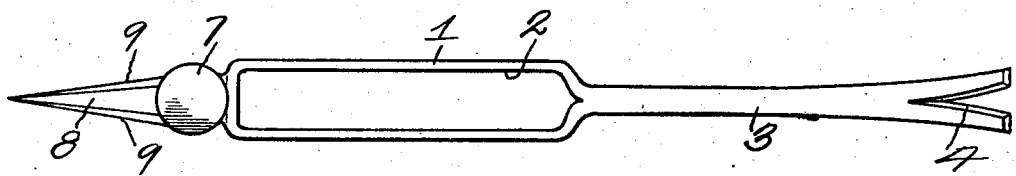
Fig. 1 is a top plan view of the tool.

Referring to the drawing, the numeral 1 designates the body of the tool, which body is provided with a vertically disposed opening 2 extending entirely therethrough. Extending rearwardly from the body 1 is a handle member 3, the end of which handle member preferably curves upwardly and is provided with a bifurcation 4, thereby not only allowing the handle member 3 to be used as a handle for operating the device, for purposes hereinafter set forth, but at the same time allows the handle member to be used as a prying tool and also for extracting nails. The under side of the body member 1 is provided with longitudinally extending spaced cutting edges 5 which are preferably in parallel relation, and which cutting edges at their forward ends merge into a transversely disposed cutting edge 6. The cutting edges 5 and 6 are used for notching the edges of the strip shingles for causing said shingles to have an ornamental appearance. During the notching operation the transversely disposed edge 6 is placed in engagement with the shingle, and then the operator can impart percussive blows on the hammer poll 7, and simultaneously rock the body member 1 downwardly while grasping the handle member 3, thereby causing the cutting edges 5 to cut through the shingle edge, consequently insuring a positive cutting operation and cooperation of the parts. Extending outwardly from the forward end of the device is a piercing member 8, which piercing member has its opposite edges 9 sharpened, and which sharpened edges are used for cutting and fitting asphalt shingles. The piercing member 8 is also used by the operator for attaching the device as a whole to the roof when there is danger of slipping and using the same as a support, and at which time the operator grasps the device and forces the projection 8 into the roof. It will be noted that the piercing member 8 is disposed in a plane above the cutting edges 5 and 6, and consequently will not interfere with the cutting operation.

Figure 2:
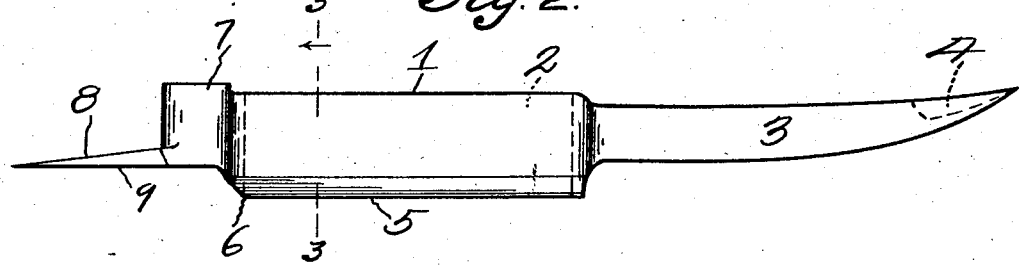
Fig. 2 is a side elevation of the tool.
Figure 3:
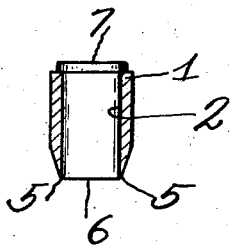
Fig. 3 is a vertical transverse sectional view through the tool taken on line 3—3 of Fig. 2.

The hammer poll 7 is used for driving nails, and at which time the tool is reversed in its position from the position shown in Fig. 2 for downwardly disposing the hammer poll 7. During the nail driving operation the operator grasps the handle member 3 and uses the device like a conventional form of hammer.

From the above it will be seen that a roofing tool is provided which will provide in a single tool the main instruments used by a roofer in applying asphalt roofing, and said device is simple in construction and is formed from a single piece of material. It will also be seen that provision is provided by the cutting edges 5 and 6 for cutting recesses or notches in the edge of a roofing strip for causing the same to present an ornamental appearance.

The invention having been set forth what is claimed as new and useful is:—

A roofing tool comprising an elongated body member having an opening extending vertically therethrough, a transverse cutting member carried by the forward end of the body member adjacent the opening, cutting members carried by opposite sides of the body member adjacent the opposite sides of the opening and merging into the transversely disposed cutting member, a hammer engaging head carried by the body member adjacent the transversely disposed cutting member, and a rearwardly extending handle member carried by the body member, said hammer engaging member being adapted to be engaged by a hammer for driving the transversely disposed cutting member through a shingle simultaneously with a downward movement of the handle member for severing the shingle with the cutting edges at opposite sides of the body member.

In testimony whereof I affix my signature.

WILLIAM E. TEKKER.